(12) United States Patent
Goto et al.

(10) Patent No.: US 8,252,103 B2
(45) Date of Patent: Aug. 28, 2012

(54) WATER-BASED INK FOR INK-JET RECORDING, INK CARTRIDGE, AND INK-JET RECORDING APPARATUS

(75) Inventors: Kazuma Goto, Nagoya (JP); Yuko Iwamura, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 389 days.

(21) Appl. No.: 12/604,484

(22) Filed: Oct. 23, 2009

(65) Prior Publication Data

US 2010/0101451 A1    Apr. 29, 2010

(30) Foreign Application Priority Data

Oct. 24, 2008   (JP) .................................. 2008-273887
Mar. 4, 2009    (JP) .................................. 2009-051229

(51) Int. Cl.
*C09D 11/02* (2006.01)
*B41J 2/01* (2006.01)

(52) U.S. Cl. .................... 106/31.48; 106/31.43; 347/86; 347/100

(58) Field of Classification Search ............... 106/31.48, 106/31.43; 347/86, 100
See application file for complete search history.

(56) References Cited

U.S. PATENT DOCUMENTS

| | | | |
|---|---|---|---|
| 5,370,731 A | 12/1994 | Yamashita et al. | |
| 5,478,383 A * | 12/1995 | Nagashima et al. | 106/31.43 |
| 5,571,313 A * | 11/1996 | Mafune et al. | 106/31.43 |
| 6,596,067 B2 | 7/2003 | Menzel et al. | |
| 7,056,376 B2 | 6/2006 | Potat et al. | |
| 7,108,743 B2 | 9/2006 | Fujiwara et al. | |
| 7,109,336 B2 | 9/2006 | Fujiwara et al. | |
| 7,198,665 B2 | 4/2007 | Nakamura et al. | |
| 7,201,477 B2 | 4/2007 | Taguchi et al. | |
| 7,306,664 B2 * | 12/2007 | Kato et al. | 106/31.43 |
| 7,368,007 B2 | 5/2008 | Kusakata et al. | |

(Continued)

FOREIGN PATENT DOCUMENTS

JP    53085626    7/1978

(Continued)

OTHER PUBLICATIONS

JP Office Action dtd Nov. 30, 2010, JP Appln. 2009-051229, partial English translation.

*Primary Examiner* — Helene Klemanski
(74) *Attorney, Agent, or Firm* — Banner & Witcoff, Ltd.

(57) ABSTRACT

The present invention provides a water-based ink for ink-jet recording containing a coloring agent and water. The coloring agent contains a dye represented by the following general formula (1). The ink further includes a substance having a structure in which a carbon atom and a nitrogen atom are covalently bound.

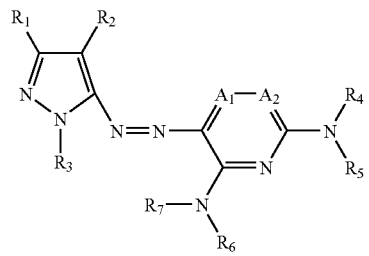

(1)

9 Claims, 1 Drawing Sheet

U.S. PATENT DOCUMENTS

| | | |
|---|---|---|
| 7,540,908 B2 | 6/2009 | Sao et al. |
| 7,674,329 B2 * | 3/2010 | Koga et al. ................. 106/31.59 |
| 8,080,099 B2 * | 12/2011 | Saito et al. ................. 106/31.48 |
| 2004/0011247 A1 * | 1/2004 | Taguchi ...................... 106/31.43 |
| 2004/0020404 A1 | 2/2004 | Potat et al. |
| 2004/0126510 A1 * | 7/2004 | Wood et al. ................. 106/31.43 |
| 2004/0134381 A1 * | 7/2004 | Taguchi et al. ............ 106/31.43 |
| 2004/0170779 A1 * | 9/2004 | Wood et al. ................. 106/31.43 |
| 2004/0207701 A1 * | 10/2004 | Iinuma ........................ 106/31.43 |
| 2005/0126434 A1 * | 6/2005 | Feldkamp ................... 106/31.43 |
| 2006/0102048 A1 | 5/2006 | Nakamura et al. |
| 2007/0173641 A1 | 7/2007 | Fujiwara et al. |
| 2007/0186807 A1 | 8/2007 | Goto et al. |
| 2007/0265376 A1 | 11/2007 | Sao et al. |
| 2008/0066644 A1 * | 3/2008 | Park et al. ................... 106/31.43 |
| 2008/0241398 A1 | 10/2008 | Kato et al. |
| 2009/0165671 A1 | 7/2009 | Okuda et al. |
| 2009/0165673 A1 | 7/2009 | Taniguchi et al. |
| 2009/0167831 A1 | 7/2009 | Okuda et al. |
| 2011/0091696 A1 * | 4/2011 | Tanaka et al. ............. 428/195.1 |

FOREIGN PATENT DOCUMENTS

| | | |
|---|---|---|
| JP | 6-220380 A | 8/1994 |
| JP | 2002053765 | 2/2002 |
| JP | 2002241659 | 8/2002 |
| JP | 2002371079 | 12/2002 |
| JP | 2002371214 | 12/2002 |
| JP | 2003231823 | 8/2003 |
| JP | 2004339335 | 12/2004 |
| JP | 2004352886 | 12/2004 |
| JP | 2005-530879 T | 10/2005 |
| JP | 2006-045539 A | 2/2006 |
| JP | 2006063340 | 3/2006 |
| JP | 2006-274024 A | 10/2006 |
| JP | 2006-274128 A | 10/2006 |
| JP | 2007217523 | 8/2007 |
| JP | 2007217524 | 8/2007 |
| JP | 2007217525 | 8/2007 |
| JP | 2008-120976 A | 5/2008 |
| JP | 2008246821 | 10/2008 |
| JP | 2009-155599 A | 7/2009 |
| JP | 2009-155600 A | 7/2009 |
| JP | 2009-155602 A | 7/2009 |
| JP | 2009-155603 A | 7/2009 |
| JP | 2009-155604 A | 7/2009 |
| JP | 2009-155605 A | 7/2009 |
| WO | 03/106572 A1 | 12/2003 |
| WO | 2008/047071 A1 | 4/2008 |

* cited by examiner

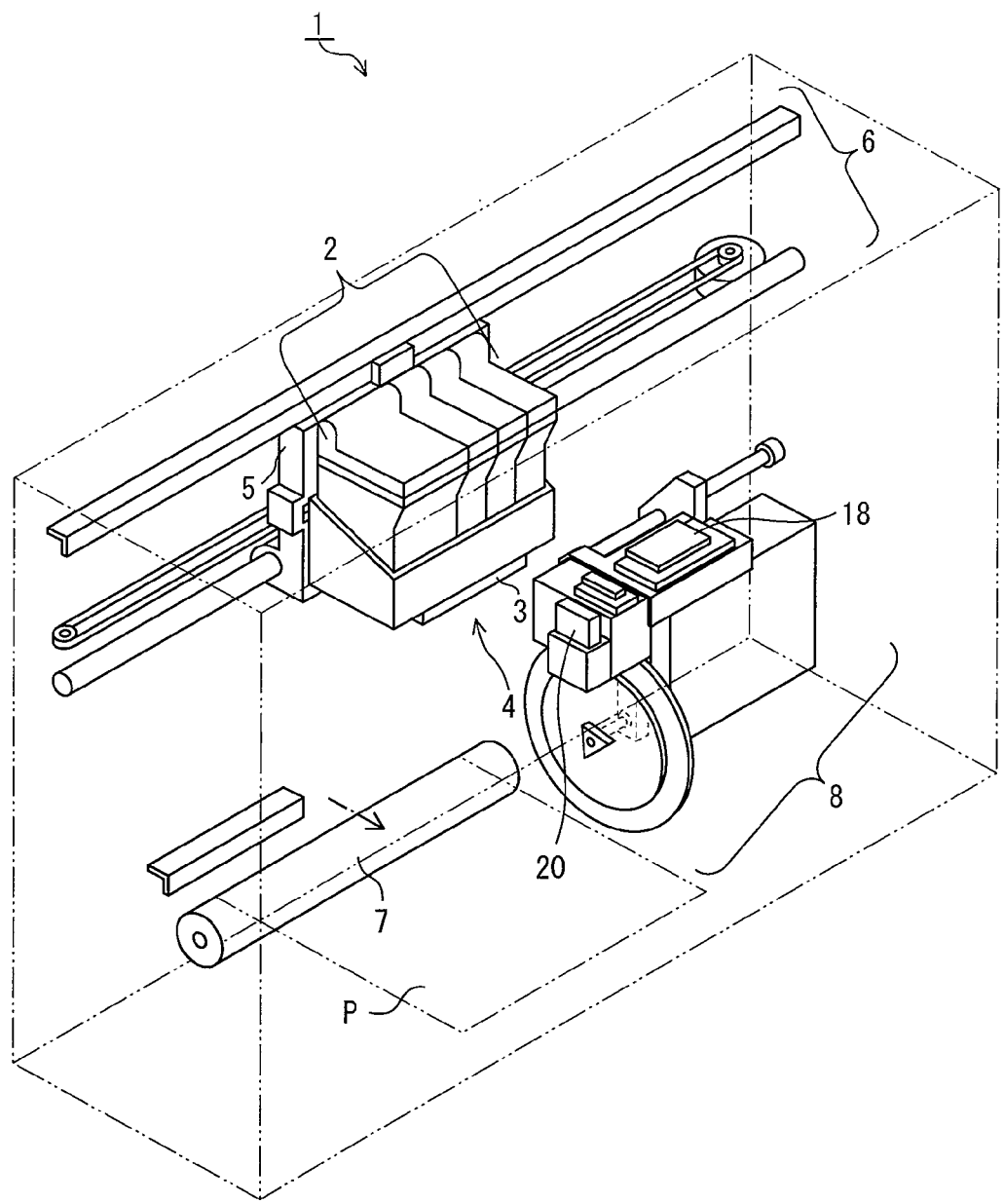

WATER-BASED INK FOR INK-JET RECORDING, INK CARTRIDGE, AND INK-JET RECORDING APPARATUS

CROSS-REFERENCE TO RELATED APPLICATION

This application claims priority from Japanese Patent Application Nos. 2008-273887 filed on Oct. 24, 2008 and 2009-051229 filed on Mar. 4, 2009. The entire subject matter of the Japanese Patent Applications is incorporated herein by reference.

BACKGROUND

Heretofore, a water-based magenta ink for ink-jet recording comprising a coloring agent and water has been used widely. The water-based ink is required to have superior toughness such as light resistance, ozone resistance, or the like of a recorded object. Further, the water-based ink is required to have superior storage stability without deteriorating during storage of a long period of time. However, there has been no conventional water-based ink that has superior toughness such as light resistance, ozone resistance, or the like of a recorded object, and has superior storage stability.

SUMMARY

A water-based ink for ink-jet recording comprises a coloring agent and water. The coloring agent comprises a dye represented by the following general formula (1), and the ink further comprises a substance having a structure in which a carbon atom and a nitrogen atom are covalently bound (CN-bond structure-comprising substance).

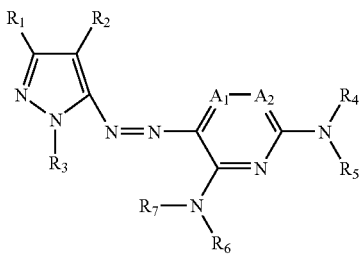
(1)

wherein in the general formula (1),
$R_1$ represents a hydrogen atom, a substituted or unsubstituted alkyl group, or a substituted or unsubstituted aryl group;
$R_2$ represents a hydrogen atom, a halogen atom, or a cyano group;
$R_3$ represents a hydrogen atom, a substituted or unsubstituted alkyl group, a substituted or unsubstituted aryl group, or a substituted or unsubstituted heterocyclic group;
$R_4$, $R_5$, $R_6$ and $R_7$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, and $R_4$, $R_5$, $R_6$, and $R_7$ may be the same or different, provided that $R_4$ and $R_5$ are not both hydrogen atoms, and that $R_6$ and $R_7$ are not both hydrogen atoms; and
$A_1$ and $A_2$ are both substituted or unsubstituted carbon atoms, or one of $A_1$ and $A_2$ is a substituted or unsubstituted carbon atom and the other is a nitrogen atom.

An ink cartridge comprises the water-based ink for ink-jet recording.

An ink-jet recording apparatus comprises an ink storing portion and an ink ejecting unit. An ink stored in the ink storing portion is ejected by the ink ejecting unit. The ink cartridge is stored in the ink storing portion.

BRIEF DESCRIPTION OF THE DRAWINGS

FIG. 1 is a schematic perspective view showing an example of the configuration of the ink-jet recording apparatus.

DETAILED DESCRIPTION

In the water-based ink for ink-jet recording, the dye represented by the general formula (1) in the ink may stabilize by the CN-bond structure-comprising substance.

In the water-based ink for ink-jet recording, the CN-bond structure-comprising substance may comprise aliphatic alcohol amine.

In the water-based ink for ink-jet recording, the aliphatic alcohol amine may comprise a compound represented by the general formula (2).

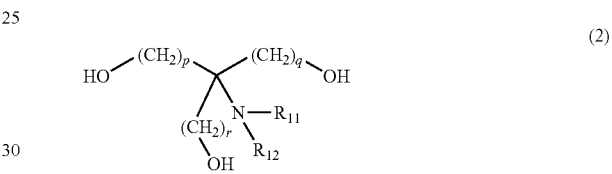
(2)

wherein in the general formula (2),
$R_{11}$ and $R_{12}$ each represent any atom or group, and $R_{11}$ and $R_{12}$ may be the same or different; and
p, q, and r each represent an integer of 1 to 3, and p, q, and r may be the same or different.

In the water-based ink for ink-jet recording, the compound represented by the general formula (2) may comprise at least one of 1,3-bis[1,1-bis(hydroxymethyl)-2-hydroxyethylamino]propane and 2-[bis(2-hydroxyethyl)amino]-2-(hydroxymethyl)-1,3-propanediol.

The pH of the water-based ink for ink-jet recording may be in the range of about 8.0 to about 11.0. Setting of the pH of the ink in the aforementioned range makes it possible to obtain a water-based ink for ink-jet recording of better storage stability. The pH of the ink may be in the range of about 9.0 to about 10.0.

Next, the water-based ink for ink-jet recording (hereinafter, also may simply be referred to as "ink" or "water-based ink") is explained. The water-based ink for ink-jet recording comprises a coloring agent and water. The coloring agent comprises a dye represented by the general formula (1).

As has been described, in the general formula (1), $R_1$ represents a hydrogen atom, a substituted or unsubstituted alkyl group, or a substituted or unsubstituted aryl group; $R_2$ represents a hydrogen atom, a halogen atom, or a cyano group; $R_3$ represents a hydrogen atom, a substituted or unsubstituted alkyl group, a substituted or unsubstituted aryl group, or a substituted or unsubstituted heterocyclic group; $R_4$, $R_5$, $R_6$ and $R_7$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, and $R_4$, $R_5$, $R_6$, and $R_7$ may be the same or different, provided that $R_4$ and $R_5$ are not both hydrogen atoms, and that $R_6$ and $R_7$ are not both hydrogen atoms;

and $A_1$ and $A_2$ are both substituted or unsubstituted carbon atoms, or one of $A_1$ and $A_2$ is a substituted or unsubstituted carbon atom and the other is a nitrogen atom.

In the general formula (1), the substituted or unsubstituted alkyl group may be an alkyl group having 1 to 6 carbon atoms. Examples of the substituted or unsubstituted alkyl group include a methyl group, an ethyl group, an n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, and the like. Examples of the substituent of the substituted alkyl group include a hydroxyl group; an alkoxy group such as a methoxy group, an ethoxy group, and the like; a cyano group; a halogen atom such as a fluorine atom, a chlorine atom, a bromine atom, an iodine atom, and the like; an ionic hydrophilic group such as a carboxylate, a sulfonate, and the like; and the like.

In the general formula (1), the substituted or unsubstituted aryl group may be an aryl group having 6 to 12 carbon atoms. However, in a case of the substituted aryl group, the number of carbon atoms does not include the number of carbon atoms of its substituent(s). Examples of the substituted or unsubstituted aryl group include a phenyl group, a naphthyl group, a p-tolyl group, a p-octylphenyl group, a mesityl group, a p-methoxyphenyl group, an o-chlorophenyl group, an m-(3-sulfopropylamino)phenyl group, and the like. Examples of the substituent of the substituted aryl group include an alkyl group such as a methyl group, an ethyl group, an isopropyl group, a tert-butyl group, an n-octyl group, and the like; the same alkoxy group as described above; the same halogen atom as described above; an alkylamino group such as a methylamino group, a dimethylamino group, and the like; an amide group; a carbamoyl group; a sulfamoyl group; a sulfoamide group; a hydroxyl group; an ester group such as a methoxycarbonyl group, an ethoxycarbonyl group, and the like; and the same ionic hydrophilic group as described above.

In the general formula (1), examples of the halogen atom include a fluorine atom, a chlorine atom, a bromine atom, an iodine atom, and the like.

In the general formula (1), the substituted or unsubstituted heterocyclic group may be a 5- or 6-membered heterocyclic group. Examples of the substituted or unsubstituted heterocyclic group include a 2-pyridyl group, a 2-thienyl group, a 2-thiazolyl group, a 2-benzothiazolyl group, a 2-furyl group, a 6-sulfobenzothiazolyl group, a 6-sulfonate benzothiazolyl group, and the like. Examples of the substituent of the substituted heterocyclic group include an amide group, a carbamoyl group, a sulfamoyl group, a sulfoamide group, a hydroxyl group, the same ester group as described above, the same ionic hydrophilic group as described above, and the like.

In the general formula (1), examples of the substituted or unsubstituted sulfonyl group include a methylsulfonyl group, a phenylsulfonyl group, and the like. Examples of the substituent of a substituted sulfonyl group include the same substituted or unsubstituted alkyl group as described above, the same substituted or unsubstituted aryl group as described above, and the like.

In the general formula (1), the substituted or unsubstituted acyl group may be an acyl group having 1 to 12 carbon atoms. However, in a case of the substituted acyl group, the number of carbon atoms does not include the number of carbon atoms of its substituent(s). Examples of the substituted or unsubstituted acyl group include an acetyl group, a benzoyl group, a chloroacetyl group, and the like. Examples of the substituent of the substituted acyl group include the same ionic hydrophilic group as described above, and the like.

As has been described, in the general formula (1), $A_1$ and $A_2$ are both substituted or unsubstituted carbon atoms, or one of $A_1$ and $A_2$ is a substituted or unsubstituted carbon atom and the other is a nitrogen atom. $A_1$ and $A_2$ may be both substituted or unsubstituted carbon atoms because better performance may be obtained. Examples of the substituent bound to the carbon atoms $A_1$ and $A_2$ include an alkyl group having 1 to 3 carbon atoms, a carboxyl group, a carbamoyl group, a cyano group, and the like.

As has been described, in the general formula (1), $R_4$ and $R_5$ are not both hydrogen atoms, and also $R_6$ and $R_7$ are not both hydrogen atoms. Moreover, in the general formula (1), when the number of substituents of a sulfonic acid group or a carboxyl group is increased, the water solubility of the dye represented by the general formula (1) tends to be improved. Therefore, the number of these substituents may be adjusted in accordance with need.

As one embodiment of the dye (1), for example, in the general formula (1), $R_1$ is an alkyl group; $R_2$ is a cyano group; $R_3$ is a hydrogen atom or a substituted or unsubstituted heterocyclic group; $R_4$ is a hydrogen atom, a substituted or unsubstituted heterocyclic group, or a substituted aryl group; $R_5$ and $R_6$ each are a substituted heterocyclic group or a substituted aryl group; $R_7$ is a hydrogen atom; $A_1$ is a substituted carbon atom; and $A_2$ is a substituted or unsubstituted carbon atom.

As another embodiment of the dye (1), for example, in the general formula (1), $R_1$ is a tert-butyl group; $R_2$ is a cyano group; $R_3$ is a hydrogen atom or a benzothiazolyl group optionally substituted by a sulfonic acid group or its alkali metal base (for example, a benzothiazole-2-yl group); $R_4$ is a hydrogen atom, a benzothiazolyl group optionally substituted by a sulfonic acid group or its alkali metal base (for example, a benzothiazole-2-yl group), or a trialkylphenyl group substituted by a sulfonic acid group or its alkali metal base (for example, a mesityl group); $R_5$ and $R_6$ each are a monoalkylphenyl group, a dialkylphenyl group, or a trialkylphenyl group optionally substituted by a sulfonic acid group or its alkali metal base (for example, a p-octylphenyl group or a mesityl group), or a benzothiazolyl group substituted by a sulfonic acid group or its alkali metal base (for example, a benzothiazole-2-yl group); $R_7$ is a hydrogen atom; $A_1$ is a carbon atom substituted by an alkyl group (for example, a methyl group); and $A_2$ is a carbon atom optionally substituted by a cyano group.

Specific examples of the dye represented by the general formula (1) include compounds represented by structural formulae (1-A) to (1-F) below.

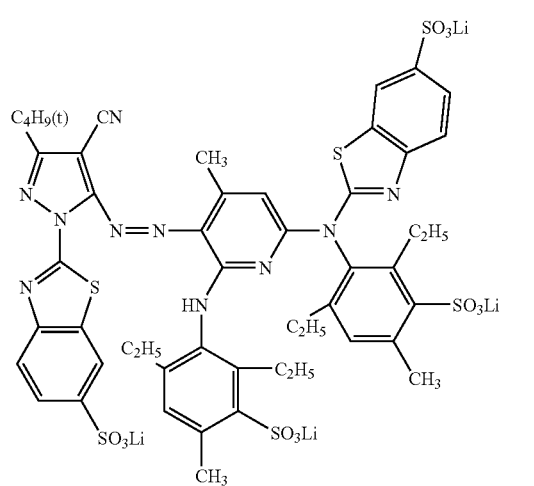

(1-A)

The compound represented by the structural formula (1-A) is one embodiment of the dye (1), wherein in the general formula (1), $R_1$ is a tert-butyl group; $R_2$ is a cyano group; $R_3$ and $R_4$ are 6-lithium sulfonate benzothiazole-2-yl groups; $R_5$ and $R_6$ are 2,6-diethyl-4-methyl-3-lithium sulfonate phenyl groups; $R_7$ is a hydrogen atom; $A_1$ is a carbon atom substituted by a methyl group; and $A_2$ is a carbon atom.

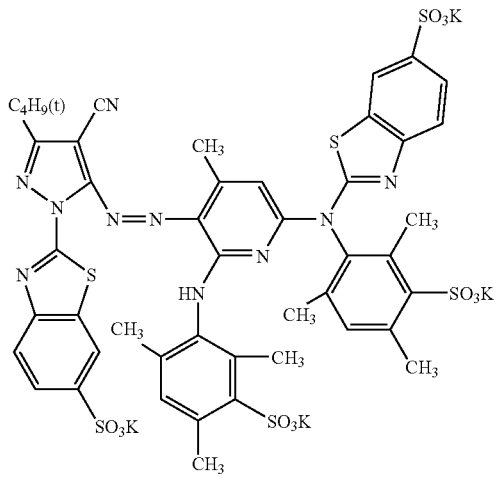

(1-B)

The compound represented by the structural formula (1-B) is another embodiment of the dye (1), wherein in the general formula (1), $R_1$ is a tert-butyl group; $R_2$ is a cyano group; $R_3$ and $R_4$ are 6-potassium sulfonate benzothiazole-2-yl groups; $R_5$ and $R_6$ are 3-potassium sulfonate mesityl groups; $R_7$ is a hydrogen atom; $A_1$ is a carbon atom substituted by a methyl group; and $A_2$ is a carbon atom.

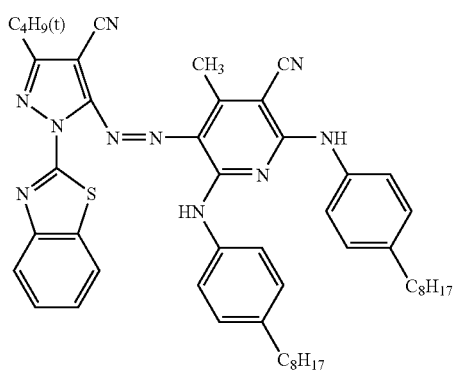

(1-C)

The compound represented by the structural formula (1-C) is still another embodiment of the dye (1), wherein in the general formula (1), $R_1$ is a tert-butyl group; $R_2$ is a cyano group; $R_3$ is a benzothiazole-2-yl group; $R_4$ is a hydrogen atom; $R_5$ and $R_6$ are p-octylphenyl groups; $R_7$ is a hydrogen atom; $A_1$ is a carbon atom substituted by a methyl group; and $A_2$ is a carbon atom substituted by a cyano group.

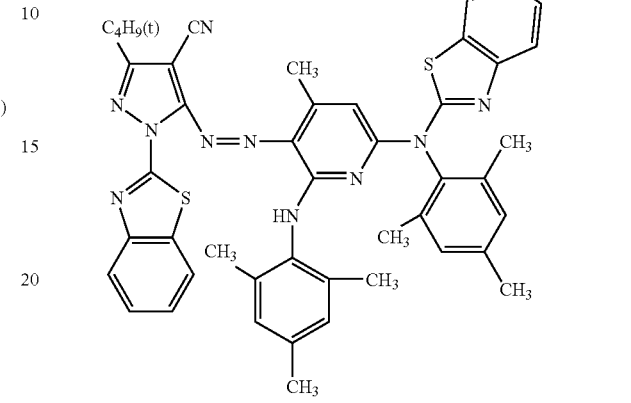

(1-D)

The compound represented by the structural formula (1-D) is yet another embodiment of the dye (1), wherein in the general formula (1), $R_1$ is a tert-butyl group; $R_2$ is a cyano group; $R_3$ and $R_4$ are benzothiazole-2-yl groups; $R_5$ and $R_6$ are mesityl groups; $R_7$ is a hydrogen atom; $A_1$ is a carbon atom substituted by a methyl group; and $A_2$ is a carbon atom.

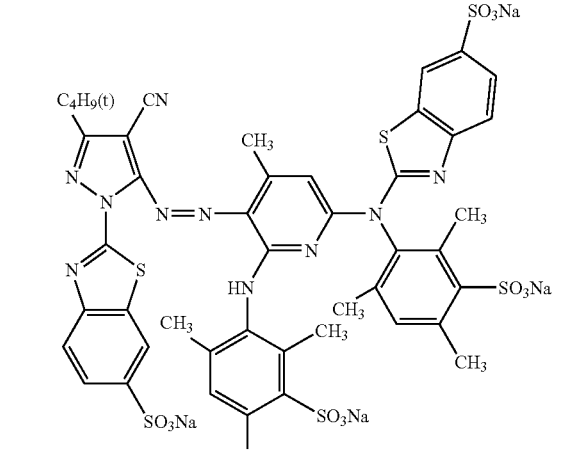

(1-E)

The compound represented by the structural formula (1-E) is yet another embodiment of the dye (1), wherein in the general formula (1), $R_1$ is a tert-butyl group; $R_2$ is a cyano group; $R_3$ and $R_4$ are 6-sodium sulfonate benzothiazole-2-yl groups; $R_5$ and $R_6$ are 3-sodium sulfonate mesityl groups; $R_7$ is a hydrogen atom; $A_1$ is a carbon atom substituted by a methyl group; and $A_2$ is a carbon atom.

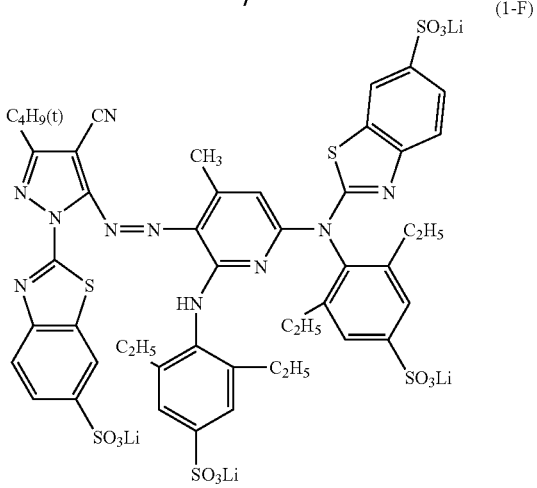

(1-F)

The compound represented by the structural formula (1-F) is yet another embodiment of the dye (1), wherein in the general formula (1), $R_1$ is a tert-butyl group; $R_2$ is a cyano group; $R_3$ and $R_4$ are 6-lithium sulfonate benzothiazole-2-yl groups; $R_5$ and $R_6$ are 2,6-diethyl-4-lithium sulfonate phenyl groups; $R_7$ is a hydrogen atom; $A_1$ is a carbon atom substituted by a methyl group; and $A_2$ is a carbon atom.

The amount of the dye, which is represented by the general formula (1), to be added is not particularly limited. When a water-based ink comprises the dye represented by the general formula (1), toughness of a recorded object that is recorded with the water-based ink may be improved. The amount of the dye, which is represented by the general formula (1), to be added with respect to the total amount of the ink is, for example, in the range of about 0.1 wt % to about 7 wt %, and about 0.2 wt % to about 5 wt %.

The coloring agent may contain only the dye represented by the general formula (1) or may further contain other dyes, pigments, and the like.

The water may be ion-exchange water or purified water. The amount of the water to be added with respect to the total amount of the ink is, for example, in the range of about 10 wt % to about 90 wt %, and about 40 wt % to about 80 wt %. The amount of the water to be added may be a balance of the other components, for example.

The water-based ink for ink-jet recording further comprises the CN-bond structure-comprising substance. The CN-bond structure-comprising substance has a function of stabilizing the dye represented by the general formula (1). For example, suppression of decomposition of the dye represented by the general formula (1) by the CN-bond structure-comprising substance makes it possible to reduce an absorbance change rate of the ink. The CN-bond structure-comprising substance may have a function of stabilizing a pH. In this case, when the pH of the ink is maintained in the aforementioned range by the CN-bond structure-comprising substance, it also contributes to stabilization of the dye represented by the general formula (1).

The CN-bond structure-comprising substance is not particularly limited, and examples thereof comprise aliphatic alcohol amine, amino acid, and the like. As described above, the CN-bond structure-comprising substance may comprise aliphatic alcohol amine. The aliphatic alcohol amine may be primary amine, secondary amine, or tertiary amine. An aliphatic group having a hydroxy end in the aliphatic alcohol amine is, for example, an aliphatic group having a straight or branched chain hydroxy end having 1 to 7 carbon atoms, and examples thereof include a hydroxymethyl group, a hydroxyethyl group, a hydroxypropyl group, a hydroxybutyl group, $-C(CH_2OH)_3$, $-(CH_2)_3NHC(CH_2OH)_3$, and the like. When an isomer exists in the aliphatic group having the hydroxy end, any isomer is applicable. For example, in a case of a "hydroxyethyl group", it may be a 1-hydroxyethyl group or a 2-hydroxyethyl group. The aliphatic alcohol amine may comprise plural amino groups. Further, the aliphatic alcohol amine may comprise plural hydroxy groups.

The aliphatic alcohol amine may comprise a compound represented by the general formula (2). In the general formula (2), $R_{11}$ and $R_{12}$ are not particularly limited and each may be any atom or group. Further, $R_{11}$ and $R_{12}$ may be the same or different. Examples of $R_{11}$ and $R_{12}$ comprise hydrogen atoms, aliphatic groups, aliphatic groups having hydroxy ends, and the like. For example, $R_{11}$ and $R_{12}$ may be a hydrogen atom, a hydroxymethyl group, a hydroxyethyl group, $-(CH_2)_3NHC(CH_2OH)_3$, or the like. When an isomer exists in $R_{11}$ and $R_{12}$, any isomer is applicable. For example, in a case of a "hydroxyethyl group", it may be a 1-hydroxyethyl group or a 2-hydroxyethyl group. As described above, in the general formula (2), p, q, and r each represent an integer of 1 to 3, and p, q, and r may be the same or different. Specific examples of the compound represented by the general formula (2) comprise 1,3-bis[1,1-bis(hydroxymethyl)-2-hydroxyethylamino]propane (structural formula (2-A)) and 2-[bis(2-hydroxyethyl)amino]-2-(hydroxymethyl)-1,3-propanediol (structural formula (2-B)).

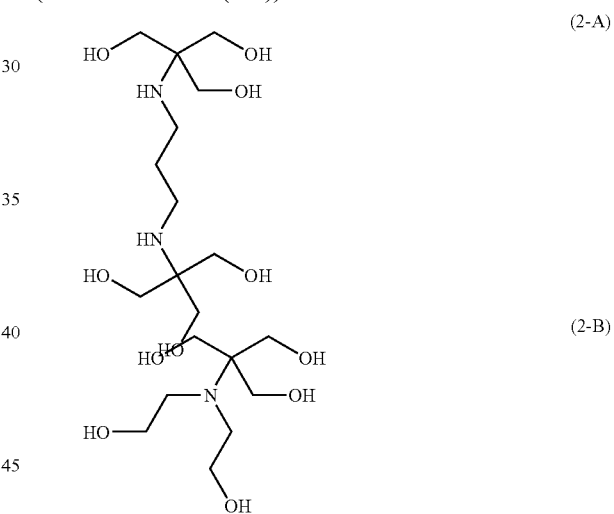

The amino acid is not particularly limited and examples thereof include lysine, arginine, hydroxylysine, and the like. Out of these, the amino acid may be lysine or arginine. The amino acid may be either L-type or D-type.

The amount of the CN-bond structure-comprising substance to be added is not particularly limited. For example, when the CN-bond structure-comprising substance has a function of stabilizing a pH, the amount of the CN-bond structure-comprising substance to be added may be determined such that the pH of the water-based ink falls within the aforementioned range. The amount of the CN-bond structure-comprising substance to be added per 100 wt % of the ink is, for example, in the range of about 0.005 wt % to about 10 wt %, about 0.005 wt % to about 8 wt %, and about 0.005 wt % to about 5 wt %, although it differs according to the type, amount, or the like of the coloring agent.

One of the CN-bond structure-comprising substances may be used alone or two or more of them may be used in combination.

The water-based ink for ink-jet recording may further comprise a humectant and a penetrant. The humectant prevents an ink from drying at a nozzle portion of an ink-jet head, for example. The penetrant adjusts a drying rate of an ink on a recording medium, for example.

The humectant is not particularly limited, and examples thereof include lower alcohol such as methyl alcohol, ethyl alcohol, n-propyl alcohol, isopropyl alcohol, n-butyl alcohol, sec-butyl alcohol, t-butyl alcohol, and the like; amide such as dimethylformamide, dimethylacetamide, and the like; ketone such as acetone, and the like; ketoalcohol such as diacetone alcohol, and the like; ether such as tetrahydrofuran, dioxane, and the like; polyalcohol such as polyalkylene glycol, alkylene glycol, glycerin, and the like; 2-pyrrolidone; N-methyl-2-pyrrolidone; 1,3-dimethyl-2-imidazolidinone; and the like. The polyalkylene glycol is not particularly limited, and examples thereof include polyethylene glycol, polypropylene glycol, and the like. The alkylene glycol is not particularly limited and examples thereof include ethylene glycol, propylene glycol, butylene glycol, diethylene glycol, triethylene glycol, dipropylene glycol, tripropylene glycol, thiodiglycol, hexylene glycol, and the like. Out of these, the humectant may be polyalcohol such as alkylene glycol, glycerin, and the like. One of the humectants may be used alone or two or more of them may be used in combination.

The amount of the humectant to be added with respect to the total amount of the ink (the proportion of the humectant in the ink) is not particularly limited and is, for example, in the range of 0 wt % to about 95 wt %, about 5 wt % to about 80 wt %, and about 5 wt % to about 50 wt %.

The penetrant is not particularly limited, and an example thereof includes glycol ether. The glycol ether is not particularly limited, and examples thereof include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, and the like. One of the penetrants may be used alone or two or more of them may be used in combination.

The amount of the penetrant to be added with respect to the total amount of the ink (the proportion of the penetrant in the ink) is not particularly limited and is, for example, in the range of 0 wt % to about 20 wt %. Setting of the proportion of the penetrant in the aforementioned range makes it possible to achieve suitable penetration of the water-based ink relative to a recording medium such as a recording paper. The proportion of the penetrant may be in the range of about 0.1 wt % to about 15 wt %, and about 0.5 wt % to about 10 wt %.

The water-based ink for ink-jet recording may further comprise a conventionally known additive as required. Examples of the additive include a surfactant, a viscosity modifier, a surface tension modifier, a mildewproofing agent, and the like. Examples of the viscosity modifier include polyvinyl alcohol, cellulose, water-soluble resin, and the like.

The water-based ink for ink-jet recording may be prepared by uniformly mixing the coloring agent, water, and the CN-bond structure-comprising substance with other added components as required by a conventionally known method, and then removing sediments with a filter, for example.

The water-based ink for ink-jet recording may be used as a water-based magenta ink. The water-based ink for ink-jet recording may be a water-based ink of a color other than magenta by further comprising a coloring agent other than a coloring agent for magenta.

Next, the ink cartridge is explained. As described above, the ink cartridge comprises the water-based ink for ink-jet recording. As a body of the ink cartridge, for example, a conventionally known body may be used.

Next, the ink-jet recording apparatus is explained. The ink-jet recording apparatus comprises an ink storing portion and an ink ejecting unit, and an ink stored in the ink storing portion is ejected by the ink ejecting unit. The ink cartridge is stored in the ink storing portion. Other than this, the ink-jet recording apparatus may have a structure similar to that of a conventionally known ink-jet recording apparatus, for example.

FIG. 1 shows a structure of an example of the ink-jet recording apparatus. As shown in FIG. 1, the ink-jet recording apparatus 1 comprises four ink cartridges 2, an ink ejecting unit (ink-jet head) 3, a head unit 4, a carriage 5, a drive unit 6, a platen roller 7, and a purge device 8 as main components.

The four ink cartridges 2 comprise water-based inks of four colors, namely, yellow, magenta, cyan, and black, respectively. For example, an ink cartridge comprising the water-based magenta ink is the aforementioned ink cartridge. The ink-jet head 3 performs recording on a recording medium P such as a recording paper. The head unit 4 is provided with the ink-jet head 3. The four ink cartridges 2 and the head unit 4 are mounted to the carriage 5. The drive unit 6 reciprocates the carriage 5 in a straight line. A conventionally known drive unit (for example, JP2008-246821) may be used as the drive unit 6. The platen roller 7 extends in a reciprocating direction of the carriage 5 and opposes to the ink-jet head 3. The recording includes recording of letters, images; printing; and the like.

The recording medium P is fed from a paper feeding cassette (not shown) positioned on a side of or underneath the ink-jet recording apparatus 1. The recording medium P is introduced between the ink-jet head 3 and the platen roller 7. Then, a predetermined recording is performed on the recording medium P with the ink ejected from the ink-jet head 3. The recording medium P then is discharged from the ink-jet recording apparatus 1. In FIG. 1, a feeding mechanism and a discharging mechanism of the recording medium P are not shown.

The purge unit 8 draws poor ink containing, for example, air bubbles trapped inside the ink-jet head 3. A conventionally known purge unit (for example, JP2008-246821) may be used as the purge unit 8.

At the platen roller 7 side of the purge unit 8, a wiper member 20 is provided adjacent to the purge unit 8. The wiper member 20 has a spatula shape, and wipes a nozzle-formed surface of the ink-jet head 3 in accordance with the movement of the carriage 5. In FIG. 1, the cap 18 covers the plural nozzles of the ink-jet head 3, which return to the reset position after the completion of recording in order to prevent the ink from drying.

In the ink-jet recording apparatus, the four ink cartridges may be mounted to plural carriages. Alternatively, the four ink cartridges may not be mounted to the carriage, but may be provided and fixed in the ink-jet recording apparatus. In this state, for example, the ink cartridges and the head unit mounted to the carriage are connected via a tube, or the like, and the ink is supplied to the head unit from the ink cartridge.

The present invention provides a dye stabilizer for stabilizing dyes comprised in a water-based ink for ink-jet recording. The dye stabilizer comprises a CN-bond structure-comprising substance. The present invention also provides a method for stabilizing dyes comprised in a water-based ink for ink-jet recording. In this method, the ink comprises dyes and the above-described dye stabilizer.

Dyes to which the above-described dye stabilizer and dye stabilizing method are applicable are not particularly limited, and examples thereof comprise dyes represented by the general formula (1). In the dye stabilizer and the dye stabilizing method, the type, blended amount, and the like of the CN-bond structure-comprising substance may be the same as those in the water-based ink for ink-jet recording.

EXAMPLES

Examples of the present invention are described together with Comparative Examples, which are provided for illustrative purposes only. The present invention is not limited by the following Examples and Comparative Examples.

Examples 1 to 6 and Comparative Examples 1 and 2

With respect to Examples 1 to 6 and Comparative Example 1, ink components and CN-bond structure-comprising substances (Table 1) were uniformly mixed. With respect to Comparative Example 2, ink components (table 1) were uniformly mixed. Thereafter, thus obtained mixtures were each filtered with a hydrophilic polytetrafluoroethylene (PTFE) type membrane filter having a pore diameter of 0.20 manufactured by Toyo Roshi Kaisha, Ltd. Thus, water-based inks for ink-jet recording of Examples 1 to 6 and Comparative Examples 1 and 2 were obtained. In the following Table 1, the dyes (1-A) and (1-B) are compounds represented by the structural formulae (1-A) and (1-B), respectively. Further, CN-bond structure-comprising substances (2-A) and (2-B) are compounds represented by the structural formulae (2-A) and (2-B), respectively.

With respect to each water-based ink of Examples and Comparative Examples, (a) storage stability evaluation, (b) ozone resistance evaluation, and (c) light resistance evaluation were carried out by the following methods. Samples for (b) ozone resistance evaluation and (c) light resistance evaluation were prepared as follows.

First, each ink cartridge was filled with each water-based ink of Examples and Comparative Examples. Next, each ink cartridge was attached to an ink-jet printer mounted digital multi-function center DCP-330C manufactured by Brother Industries, Ltd. Then, a gradation sample of the water-based ink was printed on a glossy photo paper BP61GLA manufactured by Brother Industries, Ltd., and thereby an evaluation patch having an initial OD value of 1.0 was obtained. The OD value was measured with a spectrophotometer, Spectrolino (light source: $D_{65}$; observer: 2°; and status A), manufactured by GretagMacbeth.

(a) Storage Stability Evaluation

Each water-based ink of Examples and Comparative Examples was diluted with purified water by 1600 times. Absorbance of the dilution at a wavelength of 440 nm was measured using an ultraviolet-visible-near-infrared spectrophotometer, UV3600, manufactured by Shimadzu Corporation. The measurement of the absorbance was carried out using a measurement cell with a length of 10 mm. Separately, the water-based ink was contained in a sealed container and stored for two weeks under an environment of 60° C. Next, the water-based ink after storage was diluted with purified water by 1600 times and absorbance of the dilution was measured in the same manner as the water-based ink of before storage. Then, an absorbance change rate (%) was obtained with the following formula (I) and storage stability was evaluated according to the following Evaluation Criteria. In the following formula (I), |X−Y| represents an absolute value of the difference between X and Y. The smaller the absorbance change rate becomes, the more the decomposition of the dye is suppressed, which means the storage ability of the water-based ink is higher.

$$\text{Absorbance change rate}(\%) = (|X-Y|/X) \times 100 \qquad (I)$$

X: Absorbance before storage

Y: Absorbance after storage

Storage Stability Evaluation Criteria

G: Absorbance change rate is less than 3%

NG: Absorbance change rate is 3% or more (b) Ozone Resistance Evaluation

Using an ozone weather meter, OMS-H, manufactured by SUGA TEST INSTRUMENTS CO., LTD, the gradation sample was left for 40 hours in a condition in which an ozone concentration was 2 ppm, a bath temperature was 24° C., and a bath relative humidity was 60%. Then, the OD value of the evaluation patch after being left was measured in the same manner as described above. Next, the OD value change rate (%) was obtained with the following formula (II) and ozone resistance was evaluated according to the following Evaluation Criteria. In the following formula (II), |X−Y| represents an absolute value of the difference between X and Y. The smaller the OD value change rate becomes, the less the image quality is deteriorated, which means the ozone resistance of the water-based ink is higher.

$$OD \text{ value change rate}(\%) = (|X-Y|/X) \times 100 \qquad (II)$$

X: 1.0 (initial OD value)

Y: OD value after being left

Ozone Resistance Evaluation Criteria

G: OD value change rate is less than 10%

NG: OD value change rate is 10% or more (c) Light Resistance Evaluation

Using a super xenon weather meter, SC750-WN, manufactured by SUGA TEST INSTRUMENTS CO., LTD, the gradation sample was irradiated with a xenon lamp for 200 hours in a condition in which a bath temperature was 25° C., a bath relative humidity was 50%, and illuminance was 93 klx. Then, the OD value of the evaluation patch after irradiation was measured in the same manner as described above. Next, the OD value change rate (%) was obtained with the following formula (III) and light resistance was evaluated according to the following Evaluation Criteria. In the following formula (III), |X−Y| represents an absolute value of the difference between X and Y. The smaller the OD value change rate becomes, the less the image quality is deteriorated, which means the light resistance of the water-based ink is higher.

$$OD \text{ value change rate}(\%) = (|X-Y|/X) \times 100 \qquad (III)$$

X: 1.0 (initial OD value)

Y: OD value after irradiation

Light Resistance Evaluation Criteria

G: OD value change rate is less than 10%

NG: OD value change rate is 10% or more

TABLE 1

|  |  | Example 1 | Example 2 | Example 3 | Example 4 | Example 5 | Example 6 | Comparative Example 1 | Comparative Example 2 |
|---|---|---|---|---|---|---|---|---|---|
| Ink Composition (wt %) | Dye (1-A) | 3.0 | — | 3.0 | 3.0 | — | 3.0 | — | 3.0 |
|  | Dye (1-B) | — | 3.0 | — | — | 3.0 | — | — | — |
|  | C.I. Acid Red 289 | — | — | — | — | — | — | 3.0 | — |
|  | Glycerin | 20.0 | 20.0 | 20.0 | 20.0 | 20.0 | 20.0 | 20.0 | 20.0 |
|  | Triethylene glycol-n-butyl ether | 4.0 | 4.0 | 4.0 | 4.0 | 4.0 | 4.0 | 4.0 | 4.0 |
|  | SUNNOL ® NL1430 (1*) | 0.2 | 0.2 | 0.2 | 0.2 | 0.2 | 0.2 | 0.2 | 0.2 |
|  | water | 72.8 | 72.8 | 72.8 | 72.8 | 72.8 | 72.8 | 72.8 | 72.8 |
| CN-bond structure-comprising substance (wt %) | CN-bond structure-comprising substance (2-A) | 3.6 | — | 0.01 | 0.005 | — | — | 4.2 | — |
|  | CN-bond structure-comprising substance (2-B) | — | 4.9 | — | — | — | — | — | — |
|  | L-(+)-lysine | — | — | — | — | 1.4 | — | — | — |
|  | L-(+)-arginine | — | — | — | — | — | 0.8 | — | — |
| pH |  | 9.8 | 9.7 | 8.6 | 8.2 | 10.0 | 10.1 | 9.8 | 7.7 |
| Evaluation | Storage stability | G | G | G | G | G | G | G | NG |
|  | Absorbance change rate | 0.5% | 0.6% | 1.2% | 1.7% | 0.1% | 0.9% | 0.8% | 4.5% |
|  | Ozone resistance | G | G | G | G | G | G | NG | G |
|  | OD value change rate | 3% | 2% | 3% | 3% | 5% | 3% | 14% | 4% |
|  | Light resistance | G | G | G | G | G | G | NG | G |
|  | OD value change rate | 2% | 3% | 3% | 3% | 4% | 5% | 33% | 2% |

(1*) polyoxyethylene (3E.O.) alkyl (C = 12, 13) ether sodium sulfate, manufactured by Lion Corporation, active ingredient amount = 28 wt %

As summarized in Table 1, with respect to each water-based ink of Examples 1 to 6, all results of the storage stability evaluation, the ozone resistance evaluation, and the light resistance evaluation were good. In contrast, the water-based ink of Comparative Example 1 was inferior in results of the ozone resistance evaluation and the light resistance evaluation because it does not comprise the dye represented by the general formula (1). Further, the water-based ink of Comparative Example 2 was inferior in a result of the storage stability evaluation because it does not comprise CN-bond structure-comprising substance.

It will be obvious to those having skill in the art that many changes may be made in the above-described details of the particular aspects described herein without departing from the spirit or scope of the invention as defined in the appended claims.

What is claimed is:

1. A water-based ink for ink jet recording comprising:
  a coloring agent; and
  water,
  wherein the coloring agent comprises a dye represented by the following general formula (1), and the ink further comprises a substance having a structure in which a carbon atom and a nitrogen atom are covalently bound;
  wherein the substance is at least one of 1,3-bis[1,1-bis(hydroxymethyl)-2-hydroxyethylamino]propane, 2-[bis(2-hydroxyethyl)amino]-2-(hydroxymethyl)-1,3-propanediol, lysine, and arginine;

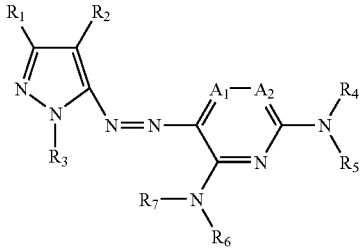

(1)

wherein in the general formula (1), $R_1$ represents a hydrogen atom, a substituted or unsubstituted alkyl group, or a substituted or unsubstituted aryl group;

$R_2$ represents a hydrogen atom, a halogen atom, or a cyano group;

$R_3$ represents a hydrogen atom, a substituted or unsubstituted alkyl group, a substituted or unsubstituted aryl group, or a substituted or unsubstituted heterocyclic group;

$R_4$, $R_5$, $R_6$ and $R_7$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, and $R_4$, $R_5$, $R_6$ and $R_7$ may be the same or different, provided that $R_4$ and $R_5$ are not both hydrogen atoms, and that $R_6$ and $R_7$ are not both hydrogen atoms; and $A_1$ and $A_2$ are both substituted or unsubstituted carbon atoms, or one of $A_1$ and $A_2$ is a substituted or unsubstituted carbon atom and the other is a nitrogen atom.

2. The water-based ink for ink jet recording according to claim 1, stabilizing the dye represented by the general formula (1) in the ink by the substance having a structure in which a carbon atom and a nitrogen atom are covalently bound.

3. The water-based ink for ink jet recording according to claim 1, wherein the substance comprises at least one of 1,3-bis[1,1-bis(hydroxymethyl)-2-hydroxyethylamino]propane and 2-[bis(2-hydroxyethyl)-amino]-2-(hydroxymethyl)-1,3-propanediol.

4. The water-based ink for ink jet recording according to claim 1, wherein a pH of the water-based ink is in a range of about 8.0 to about 11.0.

5. An ink cartridge comprising a water-based ink for ink jet recording, wherein the water-based ink is the water-based ink for ink-jet recording according to claim 1.

6. An ink-jet recording apparatus comprising:
  an ink storing portion; and
  an ink ejecting unit, an ink stored in the ink storing portion being ejected by the ink ejecting unit, wherein the ink cartridge according to claim 5 is stored in the ink storing portion.

7. The water-based ink for ink jet recording according to claim 1, wherein the dye represented by the general formula (I) is at least one of a compound represented by the structural formula (I-A) and a compound represented by the structural formula (1-B):

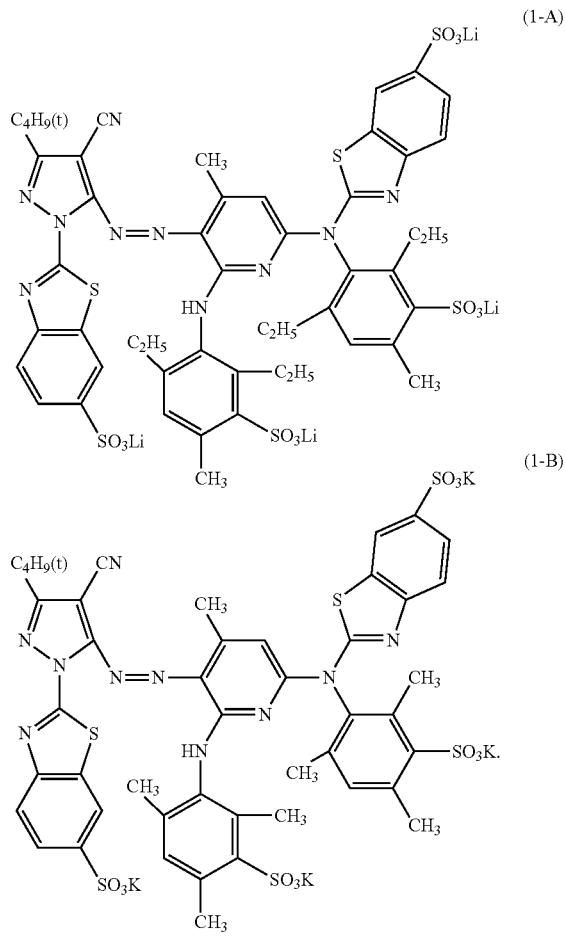

8. The water-based ink for ink jet recording according to claim 1, further comprising an ether sulfate surfactant.

9. A water-based ink for ink jet recording comprising:
 a coloring agent; and
 water,
 wherein the coloring agent comprises a dye of at least one of a compound represented by the structural formula (I-A) and a compound represented by the structural formula (1-B), the ink further comprises a substance having a structure in which a carbon atom and a nitrogen atom are covalently bound,
 the substance having a structure in which a carbon atom and a nitrogen atom are covalently bound is at least one selected from the group consisting of 1,3-bis[1,1-bis(hydroxymethyl)-2-hydroxyethylamino]propane, 2-[bis(2-hydroxyethyl)amino]-2-(hydroxymethyl)-1,3-propanediol, lysine, and arginine, and
 an amount of the substance having a structure in which a carbon atom and a nitrogen atom are covalently bound is 0.005 parts by weight to 4.9 parts by weight with respect to 100 parts by weight of the ink;

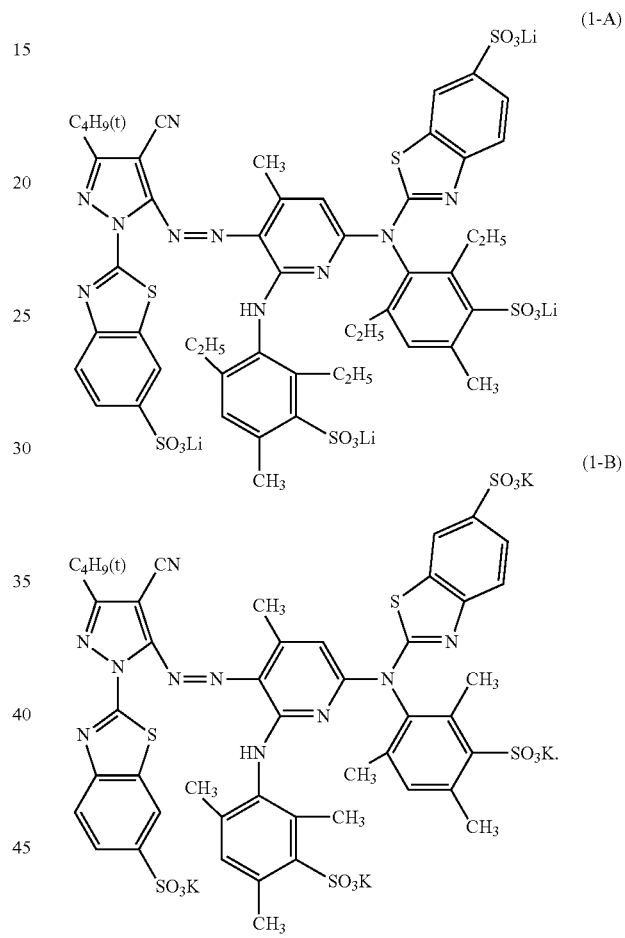

* * * * *